(12) United States Patent
Neglur

(10) Patent No.: US 10,674,061 B1
(45) Date of Patent: *Jun. 2, 2020

(54) DISTRIBUTING PROCESSING FOR IMAGING PROCESSING

(71) Applicant: Amazon Technologies, Inc., Seattle, WA (US)

(72) Inventor: Smita Neglur, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 20 days.

This patent is subject to a terminal disclaimer.

(21) Appl. No.: 15/206,665

(22) Filed: Jul. 11, 2016

Related U.S. Application Data

(63) Continuation of application No. 14/109,641, filed on Dec. 17, 2013, now Pat. No. 9,402,018.

(51) Int. Cl.
*H04N 5/232* (2006.01)
*H04N 5/247* (2006.01)

(52) U.S. Cl.
CPC ..... *H04N 5/23206* (2013.01); *H04N 5/23219* (2013.01); *H04N 5/247* (2013.01)

(58) Field of Classification Search
CPC . H04N 5/23206; H04N 5/23219; H04N 5/247
See application file for complete search history.

(56) References Cited

U.S. PATENT DOCUMENTS

| | | |
|---|---|---|
| 2007/0086626 A1 | 4/2007 | Mariani et al. |
| 2009/0109230 A1 | 4/2009 | Miller et al. |
| 2011/0032377 A1* | 2/2011 | Kim ........................ G03B 17/20 348/222.1 |
| 2011/0304541 A1 | 12/2011 | Dalal |
| 2013/0015946 A1 | 1/2013 | Lau et al. |
| 2013/0027571 A1* | 1/2013 | Parulski ................. H04N 5/232 348/207.11 |
| 2013/0120252 A1 | 5/2013 | Lam et al. |
| 2014/0039987 A1* | 2/2014 | Nerayoff ................ H04N 7/181 705/13 |

(Continued)

OTHER PUBLICATIONS

Extended European Search Report dated Jun. 26, 2017 for Application No. 14872150.9, 11 pages.

*Primary Examiner* — Christopher K Peterson
(74) *Attorney, Agent, or Firm* — Pierce Atwood LLP

(57) ABSTRACT

Approaches are described for managing the processing of images or video on a computing device. A portable computing device can include one or more dedicated components, such as an application-specific integrated circuit (ASIC) or other dedicated processor component, to be integrated into the computing device to perform at least a portion of the imaging processing of captured images or video. For example, the dedicated processor component can enable the offloading of basic image signal processing, as well as higher level or "machine vision" processing from the device processor of the device. In this way, the dedicated processor component can perform signal processing for which the input is an image (or video), and where image or video data can be analyzed, interpreted and/or manipulated to generate an output, the output of image processing being either an image or a set of characteristics or parameters related to the image. The output can be provided to a device processor for further processing.

18 Claims, 7 Drawing Sheets

(56) References Cited

U.S. PATENT DOCUMENTS

| | | | | |
|---|---|---|---|---|
| 2014/0320592 A1* | 10/2014 | Amadio | ............... | H04N 7/142 |
| | | | | 348/36 |
| 2014/0320608 A1* | 10/2014 | Muukki | ............. | G06F 13/4282 |
| | | | | 348/47 |
| 2014/0375820 A1* | 12/2014 | Priyantha | ............ | H04N 5/2258 |
| | | | | 348/164 |
| 2015/0002734 A1* | 1/2015 | Lee | ..................... | H04N 5/2256 |
| | | | | 348/367 |

* cited by examiner

DISTRIBUTING PROCESSING FOR IMAGING PROCESSING

CROSS-REFERENCE TO RELATED APPLICATION

This application is a continuation of, and claims the benefit of priority to, U.S. Non-provisional patent application Ser. No. 14/109,641, filed Dec. 17, 2013 and entitled "DISTRIBUTING PROCESSING FOR IMAGING PROCESSING," which is expressly incorporated herein by reference in its entirety.

BACKGROUND

As computing devices offer increasing processing capacity and functionality, users are able to operate these devices in an expanding variety of ways. For example, computing devices are increasingly offering multiple high quality cameras that enable additional types of functionality. In some devices, these cameras are capable of capturing high resolution images and/or videos, and can also be used to provide three-dimensional (3D) image capture for both still and video imaging. As such, these cameras can provide a large amount of imaging data and therefore present significant opportunities for performing image analysis and other computations. However, a downside to providing cameras that can capture high resolution images, and/or are capable of 3D image capture, is the fact that processing such images can be expensive in terms of computation resources and power consumption. This has been due in part on the large number of features and components that have been integrated into the device. Accordingly, manufacturers have been looking to improve the battery life and increase the processing performance of these devices.

BRIEF DESCRIPTION OF THE DRAWINGS

Various embodiments in accordance with the present disclosure will be described with reference to the drawings, in which.

DETAILED DESCRIPTION

Figure 1:
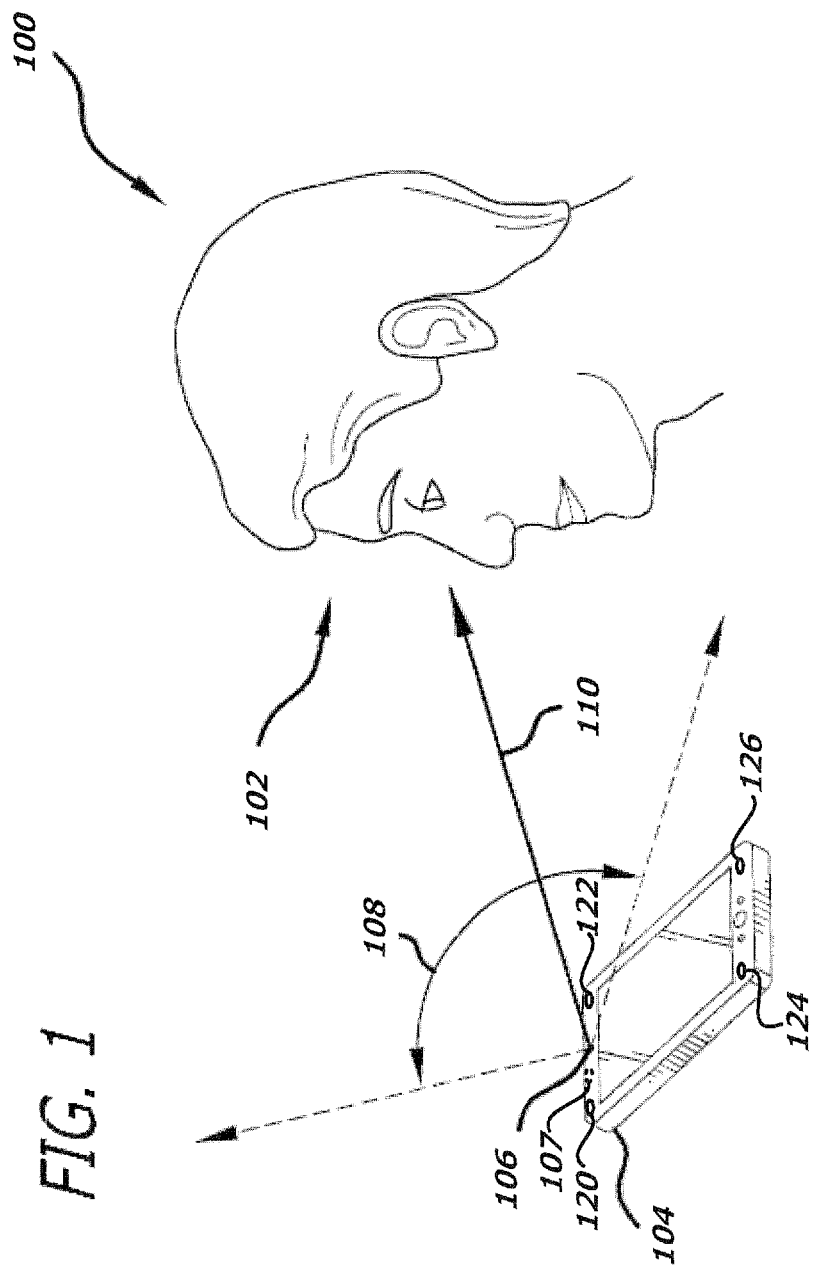
FIG. 1 illustrates an example computing device that includes a dedicated processor component, in accordance with various embodiments.

Systems and methods in accordance with various embodiments of the present disclosure may overcome one or more of the foregoing or other deficiencies experienced in conventional approaches for managing the processing of images or video via an electronic device. In particular, various embodiments provide approaches for enabling one or more dedicated components, such as an application-specific integrated circuit (ASIC) or other dedicated processor component, to be integrated into a computing device (e.g., a mobile phone, tablet computer, wearable computer, etc.) to perform at least a portion of the imaging processing of captured images or video.

For example, the dedicated processor component can enable the offloading of basic image signal processing, as well as higher level or "machine vision" processing from a general purpose processor or other device processor of the computing device. In this way, the dedicated processor component can perform image processing for which the input is an image (video or audio), and where image, video, or audio data can be analyzed, interpreted and/or manipulated to generate an output, the output being either an image or a set of characteristics or parameters related to the image, video, or audio. The output can be provided to the general purpose processor (or device processor) for further processing. The offloading of such tasks can advantageously improve battery life and performance by utilizing lower power consumption than would otherwise be consumed if only the device processor were to be utilized. In accordance with various embodiments, the device processor can be any system on a chip (SoC) designed to support applications running in a computing environment, such as on a mobile phone, tablet computer or wearable computer (e.g., smart classes, smart watch, etc.). In one embodiment, the device processor can be the processor that executes the operating system (OS) and the applications on a computing device.

In certain embodiments, the dedicated processor component can be connected to or included in a camera. In this situation, the dedicated processor component can be configured to perform specific tasks for a specific camera. For example, a first dedicated processor component connected to or included in a first camera can be configured to perform a first task, and a second dedicated processor component connected to or included in a second camera can be configured to perform a second task. For example, for the first camera the first dedicated processor can perform head tracking and for the second camera the second dedicated processor component can perform object recognition. In any situation, the dedicated processor component can perform at least a portion of the image computational processing before providing the processed image information to the device processor, where image computational processing can include image capture, processing, and manipulation techniques that enhance or otherwise extend the capabilities of image or video data, such techniques and approaches further described herein.

In various other embodiments, for example, the dedicated processor component can be shared between any number of cameras. In the situation where the dedicated processor component is shared between two or more cameras, the dedicated processor component can be configured to selectively, or alternatively, receive image data from one of the cameras at a time, process (e.g., correct for lens correction, depth pixel correction, format conversation, object identification, etc.) captured image data based on the selected imaging element, and provide the processed image data to a general purpose processor (or device processor) for further processing (such as to perform advanced object tracking features, enhance or otherwise modify the image). The multiple cameras can be independently controlled cameras that have different frame rates and/or different resolutions. Some of these cameras may be high resolution cameras, some may be medium resolution and yet other cameras may be low resolution cameras. For example, the standard rear-facing digital camera used by a user to obtain a photograph may be a high resolution camera, while other cameras (e.g. front-facing cameras used for gesture detection) may be of lower resolution.

The dedicated processor component can be connected to some or all of these cameras by way of a combiner that receives the image data from the cameras over buses capable of carrying image data (e.g., MIPI, SPI, $I^2C$). The dedicated processor component can process all of the information coming from the multiple cameras such that the device processor does not need to be woken up or invoked unless a specified event of interest occurs (e.g., a gesture is detected by the dedicated processor component, a face is recognized, etc.). In some embodiments, two or more of the cameras may be configured as stereo pairs and provide the image data to the dedicated processor component for stereo processing. The dedicated processor component can enable rectification of the images and generate disparity maps for stereo processing and the like.

As used throughout this disclosure, the terms "machine vision information" and "high level information" or "control information" are often used interchangeably and are intended to cover any information or data that can be extracted, derived or computed based at least in part on the raw image data received from the one or more cameras to the dedicated processor component. By way of some illustrative examples, the machine vision information might include user hand gesture information, facial or object recognition information, head tracking information or other information which was computed based at least in part on one or more images and which can be used to control a user interface of the device. As another example, the machine vision information may include information (e.g., disparity map) obtained from stereo processing two or more images obtained from cameras that may be configured to function as stereo pairs.

Various other functions and advantages are described and suggested below as may be provided in accordance with the various embodiments.

FIG. 1 illustrates an example situation 100 wherein a user 102 is interacting with a computing device 104. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, portable media players, and wearable computers (e.g., smart watches, smart glasses, etc.) among others. In this example, the computing device 104 includes a camera 106 positioned on a front, side, or corner of the device such that the camera will likely be able to capture image information of at least a portion of the user while the user is viewing content displayed on the device. For example, the camera 106 in FIG. 1 is on the front of the device such that an angular capture range 108 of the camera can image at least a portion of the user while the viewer is viewing content displayed on the display element of the electronic device. In accordance with the illustrated embodiment, the device further includes a rear-facing camera 107 and four corner cameras (120, 122, 124, 126). By way of illustration, the rear-facing camera 107 can be a high resolution digital camera used to take high definition video by the user of the mobile device. The front-facing camera 106 can be a medium resolution camera designed to optimize video communication (e.g., video conference call, face-to-face telephone calls, etc.) between multiple devices over a network. As used throughout this disclosure, a network can be any wired or wireless network of devices that are capable of communicating with each other, including but not limited to the cellular networks, the Internet or other Wide Area Networks (WANs), Local Area Networks (LANs), Storage Area Networks (SANs), Intranets, Extranets, and the like.

The device can utilize some of the same elements as a conventional device, such as may include a display screen. The device can also include high and/or low-resolution cameras that can include auto-focusing elements for use in still image capture or two-dimensional video capture. The device can include other elements useful for imaging as well, such as a light sensor for determining an amount of ambient light and a white light LED, or other such illumination element, useful in illuminating objects within at least a portion of a field of view of the camera. Each imaging element may be, for example, a camera including a complimentary metal-oxide semiconductor (CMOS) device, a motion detection sensor, a charge coupled device (CCD), an infrared sensor, a quantum dot imager, a gallium arsenide sensor, or any other appropriate image capturing technology.

In accordance with an embodiment, the four corner cameras (120, 122, 124, 126) can be low-resolution cameras designed specifically for user interface controls (e.g. detecting gestures without touching the mobile device, etc.). These cameras can be operating autonomously such that the device processor need only be woken up in the event of a particular event being detected. For example, the device processor may be awakened upon detecting that the user made a predetermined gesture that would cause the device processor to "unlock" the computing device, answer an incoming telephone call, or the like. Further, the cameras can acquire be used to acquire images and the image information for each image can be used by the device to determine a relative position and/or orientation of the user with respect to the device. Such image information can also be used for object recognition, object tracking, or various other purposes.

However, as mentioned above, in conventional hardware implementations, image computational processing would need to be performed by providing all of the image data from a camera to the device processor over high-speed and high power consuming image buses and processing the image data at the device processor. For example, image computational processing, such as machine vision algorithms are computationally intensive and are typically run on the device processor. These algorithms usually contain multiple steps, such as identifying an object of interest (e.g., a hand, face, head, or some other object) and analyzing the object to identify features useful in recognizing the object. In conventional hardware implementations, the device processor computes the machine vision algorithms. However, individually or the combination of the components contributes to the overall power consumption. Performing the machine vision algorithms on device processor, as opposed to a dedicated processor or set of components optimized for a particular algorithm, is expensive in terms of power consumption and computing resources.

Accordingly, in accordance with various embodiments, rather than utilizing these power-costly processes, a dedicated processor component can instead perform the majority of the image computational processing locally and only provide the extracted higher level information (e.g., machine vision information) to the device processor for further processing. For example, such image computational processing can include analyzing an image acquired by at least one camera to determine an area of interest. The area of interest can be, for example, a specific portion or object of the image, such as a face, head, hand, foot, etc. The dedicated processor component can define a portion (e.g., a window) of the image that includes the area of interest. The window can range in size, such as 50×50 pixels 100×100 pixels, or any size that includes at least a portion of the area of interest. The dedicated processor component can provide the area of interest to the device processor for further processing (e.g., feature extraction). In this way, the time and power required to transmit the entire image to the device processor and process the entire image can be saved.

In yet another example, image computational processing can include informing the device processor whenever it detects that a gesture has been made, or whenever a facial recognition has been detected. In some embodiments, the dedicated processor component can interrupt or "wake up" the device processor that is in a standby mode (e.g., "sleep" mode) upon detecting that a specific type of machine vision information has been detected. This can significantly reduce the battery power consumption, as the device processor can remain in standby mode and does not need to continuously obtain all of the image data captured by the cameras and process it. At the same time, if the device processor determines that further processing of the image data needs to be performed based on the received machine vision information, it can initiate the transfer of the image data from the dedicated processor component to the device processor. For example, the device processor can continuously inspect the high level information being received from the dedicated processor component, determine that the image data may be of interest for additional processing based on the received information, and instruct the dedicated processor component to transfer image data to the device processor as needed. In this manner, the device processor can determine when image data should be transferred to implement computationally intensive algorithms or processes, which can result in a substantial power savings.

In various embodiments, the dedicated processor component can include an image signal processor (ISP) that performs image computational processing such as low-level image signal correction, and a digital signal processor (DSP) that performs image computational processing such as high-level machine vision processing. Image computational processing such as image signal correction performed by the ISP can include actions such as dead pixel correction, lens correction, geometric correction, data compression, generating a histogram of the pixel information, automatic exposure control, automatic gain control, automatic white balance, de-mosaicing, smoothing, edge enhancement, blob identification, image thresholding, and various other processing. For example, dead pixel correction can refer to any process executed by a processor to correct defective, stuck, dead or otherwise malfunctioning pixels on a liquid crystal display (LCD). Lens correction can include any process to correct flaws caused by camera lens distortion, such as barrel or pincushion distortion, chromatic aberration and the like. Geometric correction can refer to any process for manipulating image data to make the image's projection match a specific projection surface or shape. A histogram of an image can be any representation of pixel intensity values of the image. Demosaicing can refer to any process that can be used to reconstruct an image from incomplete samples. Blob identification can refer to any process that can be used to identify distinct shapes in an image without actually determining what those shapes are. Image thresholding can be any process used to mark individual pixels in an image as object pixels if their value is greater than a threshold value (e.g., assuming an object to be brighter than the background) and as background pixels otherwise.

Image computational processing such as higher level machine vision processing performed by the DSP can include gesture tracking, head/face tracking, object tracking, face/object recognition, multiple image stereo processing (e.g. image rectification, generating stereo disparity maps), three dimensional image capture, metadata tagging of the image data (e.g., geo-tagging, time-stamping), symbol reading (e.g., barcodes, 2D ID codes), optical character recognition (OCR), one or more image fusion algorithms, sensor fusion algorithms, and the like. Other tasks can include basic level image processing, including additions and subtractions of image data that can be used for object detection, windowing of a detected object, image segmentation, exposure duration determination, ambient light determination, etc. As used herein, machine vision processing can include any process that can be used to analyze an image and extract, deduce or learn information about that image. For example, the dedicated processor component can process image data to determine when a user has made a particular hand gesture (e.g., gesture tracking), detect when a specific face is recognized (e.g., face recognition), identify that a barcode has been read and provide the value of the barcode (e.g., symbol reading), or determine other information that can be provided to the device processor and be used to control the user interface of the device.

In accordance with an embodiment, each dedicated processor component can include local memory for storing some or all of the image data received from a respective camera. This can enable the dedicated processor component to locally process the one or more images without reading/writing the data from the main memory of the device. In some embodiments, the dedicated processor component can also have an interface to the device memory of the device, to which it can write/read the data if that is deemed necessary. In accordance with various embodiments, the local memory can be accessed by the DSP to read and/or write the images or the machine vision information. In addition, the computing device may comprise its own memory which is accessible by the device processor and/or the dedicated processors. As described herein, the term memory can encompass any physical device capable of storing data, such as flash memory, solid state drive (SSD), random access memory (RAM), disk based memory and the like.

In accordance with various embodiments, an application programming interface (API) can be used to control aspects of the dedicated processor component and/or other components of the device. For example, the APIs can be used to control a camera in communication with the dedicated processor component, such as to control a camera speed, window size of a detected object, image resolution, among others. The APIs can also be used to specify an object to detect (e.g., hand, face, foot, landscape, animal, etc.) and a portion of the image including the detected object can be provided to the device processor for further processing. The dedicated processor component can interface with various other components as well, such as ambient light sensor, motion detection sensor (e.g., a gyroscope, an accelerometer, etc.), or any sensor that can increase the processing of an image captured by the camera.

Figure 2:
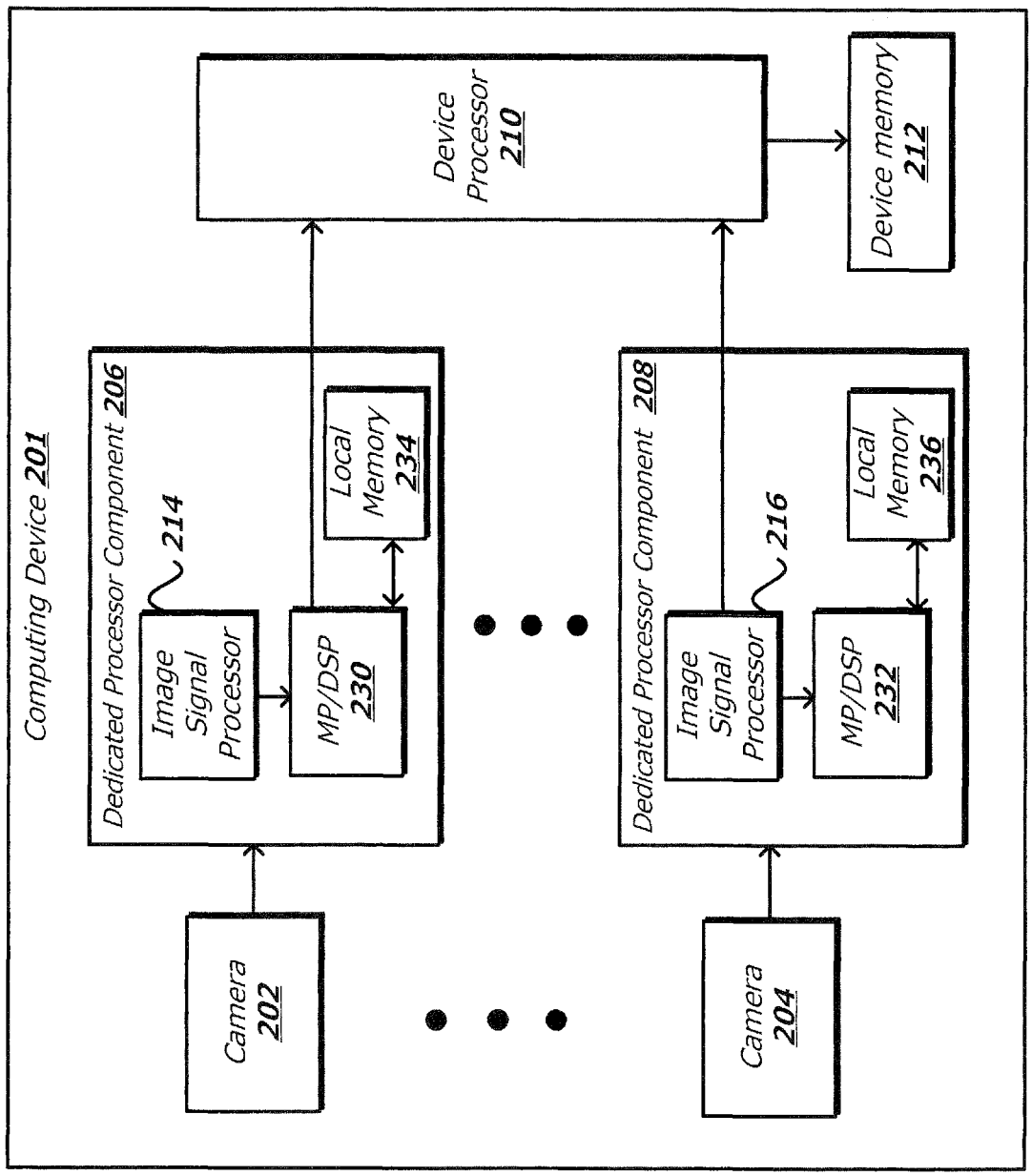
FIG. 2 illustrates an example computing device that includes a set of basic components of a dedicated processor component, in accordance with an embodiment.

FIG. 2 illustrates an example implementation 200 of a computing device including a dedicated processor component, in accordance with various embodiments. As shown in FIG. 2, the computing device 201 includes cameras 202 and 204, dedicated processor components 206 and 208, a system or device processor 210, and device memory 212. Although two cameras and two dedicated processor components are shown, these are not to be taken as limiting and more or fewer cameras and/or dedicated processor components are possible. Further, as described, the cameras can include any input device, such as low and high resolution cameras, infrared (IR) cameras, monochrome cameras, motion sensors, ultrasonic sensors, among other input capturing devices. Further still, it should be understood that various other arrangements and combinations can be used as well within the scope of the various embodiments, such as those shown in FIG. 3 and FIG. 4.

As shown in FIG. 2, each camera can have a direct or dedicated connection to a dedicated processor component. For example, camera 202 can be connected to dedicated processor component 206, and camera 204 can be connected to dedicated processor component 208. Dedicated processor components 206 and 208 can be connected to the device processor 210. The device processor can be utilized for various timing control, image processing functions, image computational processing functions, and in at least some embodiments can perform additional processing on image or video data captured by the imaging elements, where the additional processing and/or at least some of these actions can be beyond the capability of the dedicated processor component. For example, the in various embodiments, the general purpose processor (or device processor) can be configured to perform at least one of gesture detection, object tracking, object recognition, stereo processing of two or more images, three dimensional (3D) image capture, image metadata tagging, time-stamping, geographical tagging, symbol reading, depth mapping, image rectification, edge detection, image scaling, object character recognition, audio recognition, or video recognition.

Dedicated processor components 206 and 208 can include respective image signal processors 214 and 216, MP/DSPs 230 and 232 to perform various image computational processing approaches, and local memory components 234 and 236. In accordance with various embodiments, the dedicated processor components can implement image computational processing functions or other functions, and the local memory or other storage element can be used to store the functions and/or other data such as at least a frame's (e.g., image) worth of data. For example, in accordance with an embodiment, each dedicated processor component can analyze the image data coming in from a respective camera, video data, and/or audio data. In the situation of image data, the data can be analyzed and the dedicated processor component can send small packets of information to the device processor containing high level information (e.g., machine level information). In various embodiments, at least some system-level control and image computational processing functions can be implemented by the dedicated processor components. Such functions enable a sensor and related components to function as a camera without accessing external control circuitry, principally sourcing of clocks to serially read out the data including options for decimation (skipping pixels, or groups of pixels during readout), binning (summing adjacent groups of pixels), windowing (limiting serial readout to a rectangular region of interest), combinations of decimation and windowing, aperture correction (correction of the lens vignetting), and lens correction (correction of the lens geometric distortion, at least the radially symmetric portion). Other examples of image computational processing functions include "blob" or region detection for segmenting fingers for hand gestures and face detection and tracking for head gestures. In certain situations, the dedicated processor component is operable to run one or more image computational processes in parallel, wherein the one or more image computational processes include one of gesture detection, object detection, object recognition, or image enhancement, or any of the other image computational processes described herein. Performing these functions and others on the dedicated processor component enables the device processor to remain in standby mode or perform other functions, thereby alleviating the amount of power used by the device processor.

As illustrated, the dedicated processor component includes both an ISP for performing correction and other low level image processing, and a MP/DSP for performing higher level computations and data analysis on the image data. The ISP can perform bad pixel correction, relative illumination correction and de-mosaicing on the images received from the cameras. The microprocessor (MP) or digital signal processor (DSP) can be configured to perform machine vision processing of the image data. In a first example, the MP or DSP can analyze an image acquired by at least one camera to determine an area of interest. The area of interest can be, for example, a specific portion or object of the image, such as a head of a user of the computing device, a facial feature of the user, a hand of the user, a foot of the user, an object, audio information, or other information such as character information or video information among others. The MP or DSP can define a portion (e.g., a window) of the image that includes the area of interest. The window can range in size, such as 50×50 pixels 100×100 pixels, or any size that includes at least a portion of the area of interest. The MP or DSP can provide the area of interest to the device processor for further processing (e.g., feature extraction). This can include providing the window of the image, that is the pixels values including in the window, to the device processor. In various other embodiments, the entire image may be provided to the device processor as well as coordinates or other information indicating the area of interest.

In a second example, the dedicated processor component can be used to process gesture and face tracking information. In the illustrated embodiment, the device can be placed on a surface with the display screen facing up. In this example, the device can include a number of front-facing corner cameras, as previously described in FIG. 1. When a user makes a gesture in the view of the four cameras, one or more of the cameras can capture the information and provide it to a respective dedicated processor component for processing. For example, a first camera may continue capturing images and the dedicated processor component of that camera can process those images to extract the gesture information or the like. When the dedicated process detects that a predetermined gesture has been made, it can awaken the device processor by sending the high level information to the device processor. The device processor can in turn inspect the received information and then decide whether to retrieve the image data from the dedicated processor component for further processing. Similarly, when a user's face moves into the view of one or more of the cameras (e.g., front-facing camera), the dedicated processor component may process the image to perform facial recognition. For example, if the dedicated processor component determines that the face of the user corresponds to the owner, it may invoke the device processor to perform some processing (e.g., unlock the phone, etc.).

The cameras (202 and 204) can be any type of camera that can be integrated into a computing device. For example, the cameras connected to a respective dedicated processor component may be high resolution, medium resolution, or low resolution cameras. Some or all of the cameras may have special modes (e.g., global shuttering, rolling shuttering). Some of the cameras may be monochrome while others may be full color. Some of the cameras may be configured as stereo pairs, while others may function independently of each other. Some cameras may have different frame rates from other cameras. In accordance with an embodiment, each camera feeds into a respective dedicated processor component. It should be noted that although the illustration shows two cameras connected to the dedicated processor components, the number of cameras should not be perceived as a limitation to all the various embodiments contemplated herein and that in alternative embodiments, the number of cameras and/or dedicated processor components can include any number.

In accordance with an embodiment, the cameras can be connected to a respective dedicated processor component by way of any link that is appropriate for sending image data. For example, the higher definition cameras can be connected using a Mobile Industry Processor Interface (MIPI) bus, while the lower resolution cameras may be connected by way of serial peripheral interface (SPI) or an Inter-Integrated Circuit ($I^2C$) bus. The interface between the dedicated processor components and the device processor can also be any link, such as a lower power and low speed interface such as an $I^2C$ bus.

In accordance with various embodiments, the dedicated processor components can access various device sensors 350, such as a camera controller and/or any other element, sensor, or controller. These and various other components can be controlled or otherwise managed using the dedicated processor component and/or device processor using an application programming interface (API) or other interface, device or system component or service. In various embodiments, various APIs can be used to control aspects of the dedicated processor component as well as the various other device sensors, components, and/or controllers of the device. These device sensors, controllers and/or other components can include an ambient light sensor, motion detection sensor (e.g., a gyroscope, an accelerometer, etc.), an illumination controller that can be used to control and/or adjust an amount of illumination used to capture image or video data, or any sensor that can be controlled or accessed by the device processor and/or dedicated processor. Further, the APIs can be used to control a camera in communication with the dedicated processor component, such as to control a camera speed, window size of a detected object, image resolution, among others. Further still, the APIs can be used to specify an object to detect (e.g., hand, face, foot, landscape, animal, etc.) and a portion of the image including the detected object can be provided to the device processor for further processing. In various embodiments, the device sensor and other components 350 can be controlled by the dedicated processor component and/or the device processor. It should be noted that although device sensors 350 are shown separate from the general purpose processor (or device processor) and dedicated processor component, in various embodiments, certain device sensors or at least a portion of their functionality can be included in the dedicated processor component, device processor, and/or distributed between the dedicated processor component and device processor.

In accordance with various embodiments, the camera controller can be used to enable/disable an image or video capture mode, where the camera controller can send a signal, or other such communication to the dedicated processor component that one of the imaging elements is in operation. The camera controller can perform other functions, such as control the operation of a lens system such as to control photographic lens functions such as zoom, focus, etc. It should be understood, however, that other elements or controllers such as the illumination controller and the camera controller can alternatively (or additionally) be part of the dedicated circuitry or part of the device processor, and that other controllers can be used in conjunction with, or used instead of the illumination and camera controller.

Figure 3:
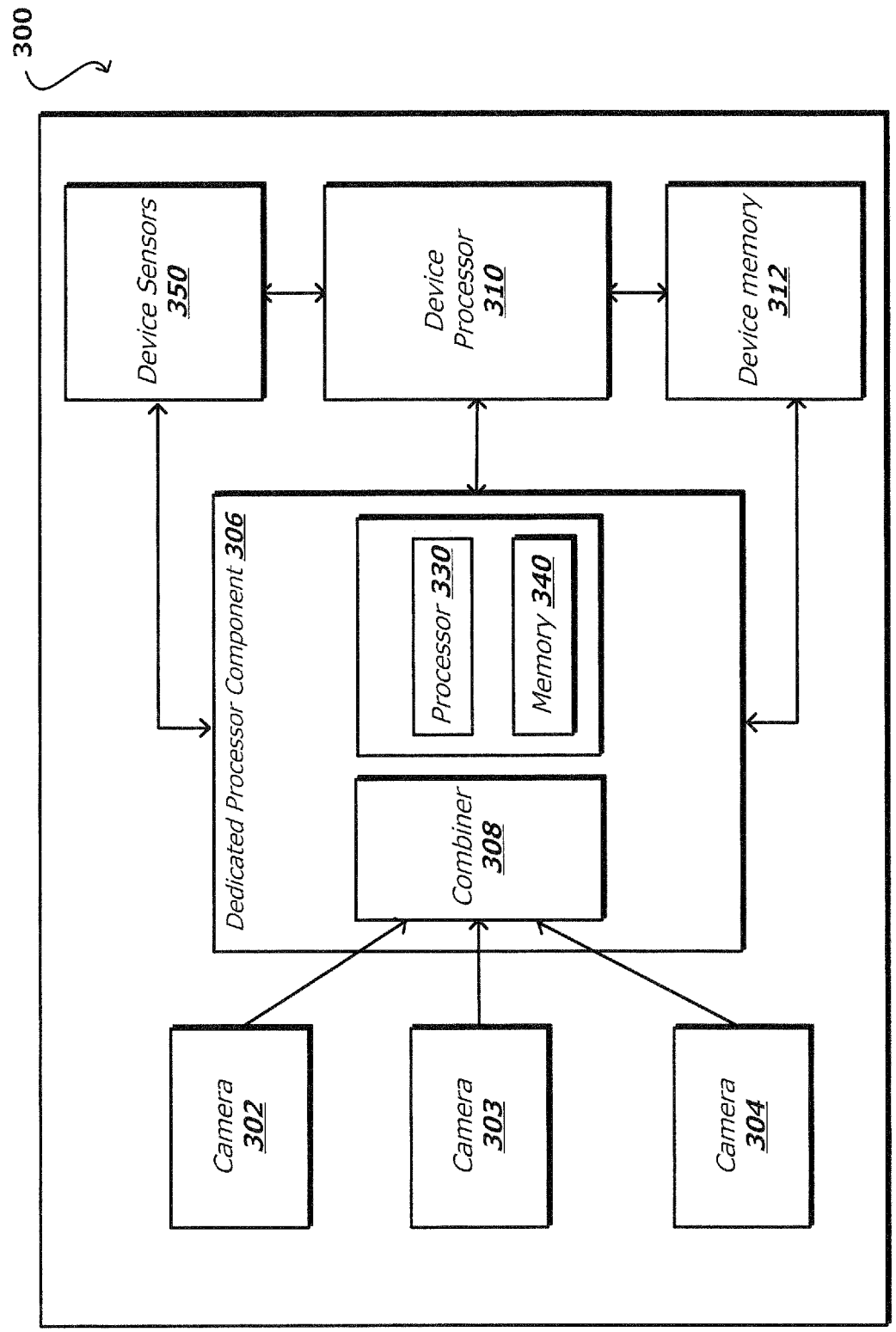
FIG. 3 illustrates an example computing device that includes a set of basic components of a dedicated processor component, in accordance with an alternate embodiment.

FIG. 3 illustrates an example alternate implementation 300 of a computing device that includes a dedicated processor component, in accordance with various embodiments. The structure depicted in this illustration is similar to the structure depicted in FIG. 2, with some notable differences. As shown in FIG. 3, the dedicated processor component 306 includes a combiner 308 that is connected to three cameras (302, 303, and 304). The combiner can be any component that receives multiple digital or analog input signals (e.g., image data streams) and produces one or more output signals. The combiner makes it possible for multiple cameras (302, 303, and 304) to share a single dedicated processor component. In some embodiments, the combiner 308 multiplexer (mux) or other such component can sequentially receive one of the incoming signals and provide the selected input to the recipient component (e.g., the device processor 330). In other embodiments, the combiner can simultaneously provide both signals to the receiving component, combine the signals and/or the like. In other embodiments, the combiner is capable of both (1) switching between the multiple signals; and (2) combining multiple signals into one resulting signal that is provided to the device processor 330.

In accordance with various embodiments, camera 302 may be a rear-facing high resolution camera integrated into the device, camera 303 may be a front-facing medium resolution camera designed for optimizing face-to-face video communication over a network, and camera 304 may be low resolution front-facing camera designed for sensing gestures and other user interface controls. In various embodiments, all of these cameras may be independently controlled, have different frame rates, etc.

The dedicated processor component includes a processing component 330 and local memory 340. As described, the processing component can include an ISP and MP/DSP, as described in regard to FIG. 2. The dedicated processor component can communicate with the device processor 310 such as by transmitting image data to the device processor. In some embodiments, the dedicated processor component can provide image data from certain cameras (e.g., rear-facing high resolution camera) directly to the device processor so that it can be manipulated, stored in the main device memory 312 or otherwise processed by the device processor. In other embodiments, the device processor may initiate the transfer of image data over from the dedicated processor component over a high-speed bus if it determines that further processing is needed, as previously described. For example, the device processor may periodically receive high level machine vision information from the dedicated processor component and analyze the information according to various instructions (e.g., application, operating system, etc.). If the device processor determines that it needs the original image data to perform further computations on the data, the device processor can cause to be transferred the bulk of the image data from the dedicated processor component to the device processor. In this manner, the dedicated processor component can analyze the images from a number of cameras and interpret the meanings of those images, all without turning on the device processor which may be expensive in terms of power consumption.

In some embodiments, the dedicated processor component can read/write data directly to the device memory 312, bypassing the device processor. This allows the dedicated processor component to write the image data and/or the high level machine vision information directly to memory, bypassing the need to provide the data to the device processor. This can provide improvements for certain applications and can further offload some processing from the device processor. For example, a camera (e.g., a rear-facing camera) can be enabled and the dedicated processor component can receive image data from the rear-facing camera. This can occur, for example, when a user starts an image capture program on a computing device, where starting the program can enable the rear-facing camera. The user can switch or otherwise optionally enable the front-facing camera by, e.g., selecting an option on the device that switches between the rear-facing camera and the front-facing camera, and the dedicated processor component can then receive image data from the front-facing camera. Additionally or alternatively, the user can start a video chat program or other such program that can enable use of the front-facing camera. In any situation, captured image data from the front, rear, or another camera can be received and processed by the dedicated processor component.

In accordance with various embodiments, a camera can be used to capture image or video data, and the dedicated processor component can access a configuration file to determine how to process captured image or video data for the camera. For example, the configuration file can include image signal processing algorithms and/or settings operable with one or more imaging elements, where in some instances the signal processing algorithms are particular to a camera, and in other instances the signal processing algorithms can be used with any camera. Thus, based at least in part on the selected camera, the circuitry can use the configuration file to perform one or more image signal processing algorithms (such as to process a digital image data or to compress video data), and/or set one or more settings such as a frame rate or exposure time or some other functionality associated with an imaging element.

In accordance with an embodiment, in the situation where multiple cameras are operating at the same time, the combiner, multiplexer (mux), or other such component can be used to select and/or switch between the cameras such that the cameras have access to the dedicated processor component. For example, the combiner can be used to select camera 302, where image or video data captured by the camera 302 is forwarded or otherwise communicated to the dedicated processor component. In this way, the data captured by the cameras is processed concurrently using the dedicated processor component. In other embodiments, the combiner can route image data captured by one of the cameras to the dedicated processor component, and can route image data captured by the other imaging element to the device processor or other processor separate from the dedicated processor component. In this way, the image data being captured by the cameras can be processed concurrently (i.e., some data by the dedicated processor component and other data by the device processor). In various other embodiments, the combiner can route data captured by any one of (or both of) the imaging elements directly to a device processor, and thus, can bypass the dedicated processor component.

As described, other arrangements are also possible, where a combiner is not used to route the captured data. In this case, any of (or all of) the cameras can directly communicate captured data to a dedicated processor component, to a device processor, between the dedicated processor component and device processor, or in the situation where each camera has dedicated processor component, each camera can communicate captured data directly to their respective dedicated processor component.

Figure 4:
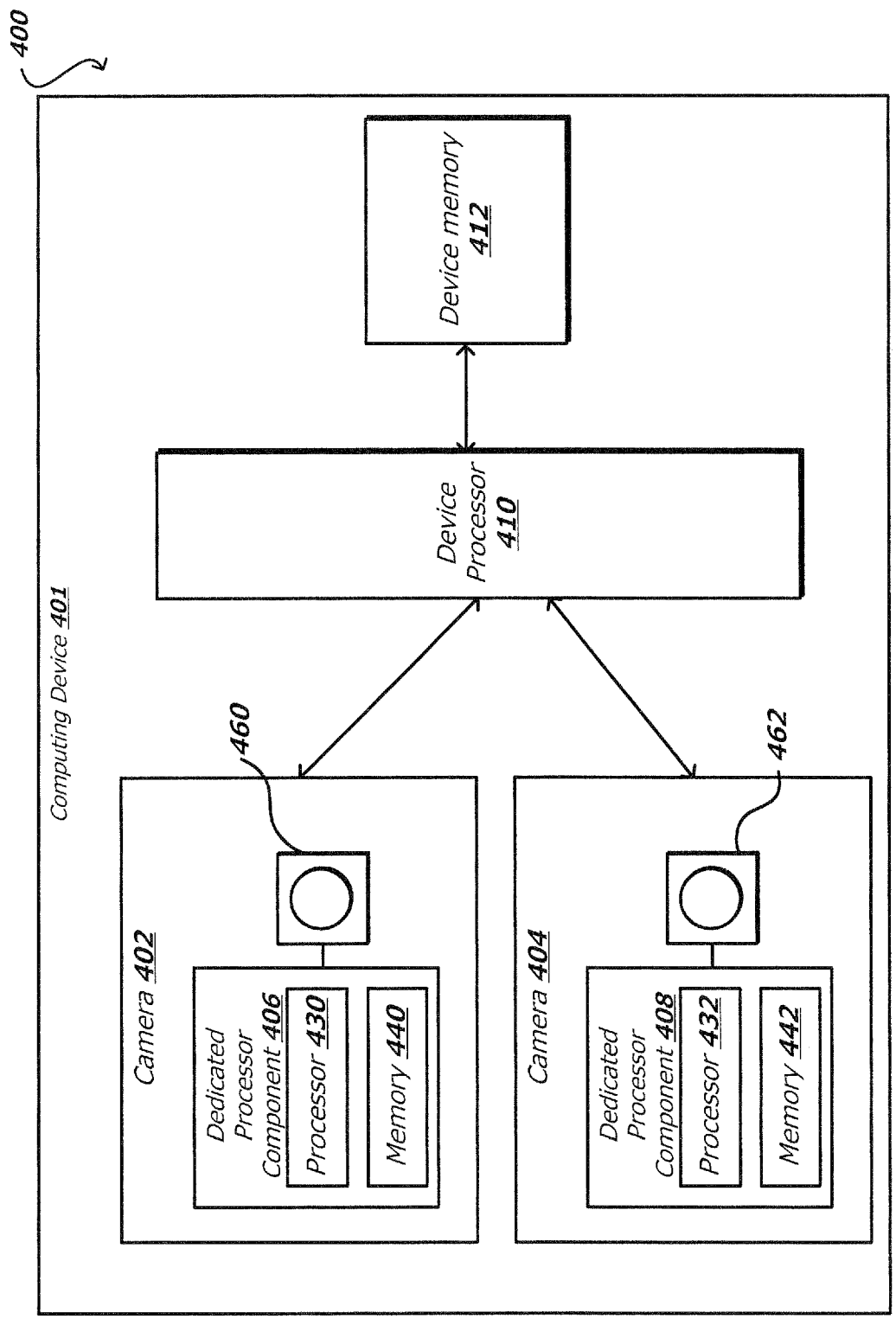
FIG. 4 illustrates an example computing device that includes a set of basic components of a dedicated processor component, in accordance with an alternate embodiment.

It should be noted that although the dedicated processor components of FIG. 2 and FIG. 3 are illustrated as independent components, in alternative embodiments, these components can be integrated into other elements and structures. For example, the dedicated processor components can be integrated into a camera, another processor, and the like. For example, FIG. 4 illustrates an example alternate implementation 400 of a computing device that includes a dedicated processor component integrated into a camera, in accordance with various embodiments. As shown in FIG. 4, a first camera 402 includes dedicated processor component 406 or other control processor that can implement image computational processing functions or other functions. The dedicated processor component includes a processing component 430 and local memory 440 to store the functions and/or other data, similar to those described in regard to FIG. 3. Camera 402 further includes at least one imaging element 460 configured to capture an image and/or an image. A second camera 404 includes dedicated processor component 408. The dedicated processor component includes a processing component 432 and local memory 442. Camera 404 further includes at least one imaging element 462.

As described, at least some system-level control and image computational processing functions can be implemented by the dedicated processor component. Such functions enable a sensor and related components to function as a camera without accessing external control circuitry, principally sourcing of clocks to serially read out the data including options for decimation (skipping pixels, or groups of pixels during readout), binning (summing adjacent groups of pixels), windowing (limiting serial readout to a rectangular region of interest), combinations of decimation and windowing, aperture correction (correction of the lens vignetting), and lens correction (correction of the lens geometric distortion, at least the radially symmetric portion). Other examples of on-chip image-processing functions include "blob" or region detection for segmenting fingers for hand gestures and face detection and tracking for head gestures. Various other types of functionality can be provided on the cameras as well in other embodiments.

Each camera can access a device processor 410, or other such element, and/or any other element or controller such as an illumination controller that can be used to control and/or adjust an amount of illumination used to capture image or video data. It should be understood, however, that other elements or controllers such as the illumination controller and the camera controller can alternatively (or additionally) be part of the dedicated processor component or part of the device processor, and that other controllers can be used in conjunction with, or used instead of the illumination and camera controller. In accordance with an embodiment, the device processor can be utilized for various timing control and image computational processing functions, and in at least some embodiments can perform additional processing on image or video data captured by the imaging elements, where the additional processing and/or at least some of these actions can be beyond the capability of the dedicated processor component processing of the imaging elements.

For example, the device processor can perform image enhancement, image restoration, image compression or other image processing. In accordance with an embodiment, image enhancement can include accentuation, or sharpening, of image features such as boundaries, or contrast to make a graphic display more useful for display and analysis; image enhancement can include gray level and contrast manipulation, noise reduction, edge crispening and sharpening, filtering, interpolation and magnification, pseudo coloring, and so on; and image restoration can include filtering the observed image to minimize the effect of degradations, and image compression can include minimizing the number of bits required to represent an image.

Figure 5:
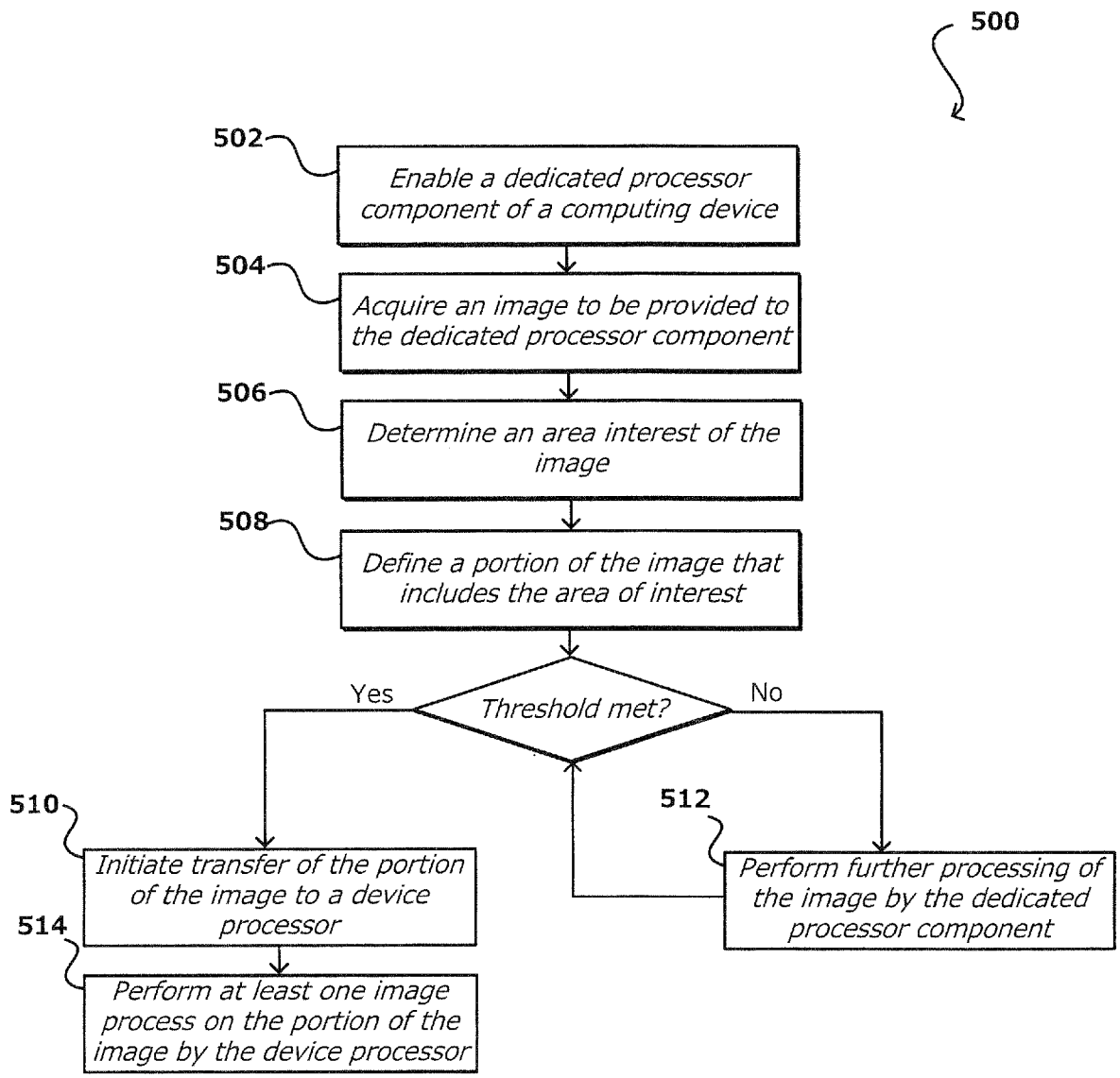
FIG. 5 illustrates an example process that can be performed by the dedicated processor component, in accordance with various embodiments.

FIG. 5 illustrates an example process of managing the processing of images or video on a computing device, in accordance with various embodiments. It should be understood that, for any process described herein, that there can be additional or fewer steps performed in similar or alternative orders, or in parallel, within the scope of the various embodiments unless otherwise stated. A computing device processor that includes at least one camera and an application-specific integrated circuit (ASIC) or other dedicated processor component can be enabled 502. In various embodiments, the device can include a plurality of cameras and/or dedicated processor components, as well as various other components such as a combiner, an interface, etc. The camera can acquire 504 at least one image and the image can be provided to the dedicated processor component. As described, at least a portion of one or more image computational processing can be offloaded from a computing device processor to the dedicated processor component. For example, the dedicated processor component can enable the offloading of basic image computational processing that can include image signal processing, as well as higher level image computational processing that can include machine vision processing from the device processor of the device. In this way, the dedicated processor component can perform image computational processing for which the input is an image (or video), and where image or video data can be analyzed, interpreted and/or manipulated to generate an output, the output of image processing being either an image or a set of characteristics or parameters related to the image.

For example, the dedicated processor component can be configured to analyze the image to determine 506 an area of interest and define 508 a portion of the image that includes the area of interest. In another example, the dedicated processor component can inform the device processor whenever it detects that a gesture has been made, or whenever a facial recognition has been detected. In yet another example, in some embodiments, the dedicated processor component can interrupt or "wake up" the device processor that is in a standby mode (e.g., "sleep" mode) upon detecting that a specific type of machine vision information has been detected. This can significantly reduce the battery power consumption, as the device processor can remain in standby mode and does not need to continuously obtain all of the image data captured by the cameras and process it. In yet another example, the dedicated processor component can include gesture tracking, head/face tracking, object tracking, face/object recognition, multiple image stereo processing (e.g. image rectification, generating stereo disparity maps), three dimensional image capture, metadata tagging of the image data (e.g., geo-tagging, time-stamping), symbol reading (e.g., barcodes, 2D ID codes), optical character recognition (OCR) and the like.

In response to determining that the processing of the image by the dedicated image processor meets a threshold, the dedicated processor component can initiate 510 transfer of the portion of the image to the device processor. For example, in various embodiments, the device processor can determine that the processing of the image by the dedicated processor component meets a predetermined threshold, test criteria, or other threshold metric, and can cause machine vision information or other information corresponding to the image to be provided to the device processor. In this way, when the processing meets the threshold, the dedicated processor component is triggered to cause the image information to be provided to the device processor. In various embodiments, the threshold can be an amount or percentage of processing for a certain task (e.g., object detection, identification, recognition, etc.). For example, the threshold can represent a certain decision, transition, or break in a decision tree, a number of processing steps preformed, a minimum or maximum amount of processing time, etc. In some embodiments, this can include detecting a certain object, such as a face, a number of objects, detecting movement of an object, performing a predetermined number of processing steps, etc. In some situations, the threshold can be changed or altered, can be specific to particular cameras or the same for each camera. In this way, the device processor can set new, add, remove, or adjust an existing threshold. In this manner, the device processor can determine when image data should be transferred to implement computationally intensive algorithms or processes, which can result in a substantial power savings. At the same time, if the device processor determines that further processing of the image data needs to be performed based on the received machine vision information, it can initiate the transfer of the image data from the dedicated processor component to the device processor. For example, the device processor can continuously inspect the high level information being received from the dedicated processor component, determine that the image data may be of interest for additional processing based on the received information, and instruct the dedicated processor component to transfer image data to the device processor as needed.

When the processing does not meet or otherwise satisfy the threshold, the dedicated processor can perform 512 further processing of the image before initiating transfer of the portion of the image to the device processor. Further processing can include object detection, image segmentation, etc. When the further processing meets the threshold, the dedicated processor component can initiate transfer of the portion of the image to the device processor.

Thereafter, the device processor can perform 514 at least one image process on the portion of the image. For example, in certain embodiments, upon receiving the portion of the image from the dedicated processor component, the device processor analyzes the image to identify a plurality of feature points; generates, based at least in part upon the plurality of feature points, a plurality of feature vectors representative of an object in the image; and identifies the object based at least in part on the plurality of feature vectors. In various embodiments, other processing by the device processor can be performed. Such processing can include advanced object tracking features, enhance or otherwise modify the image.

Figure 6:
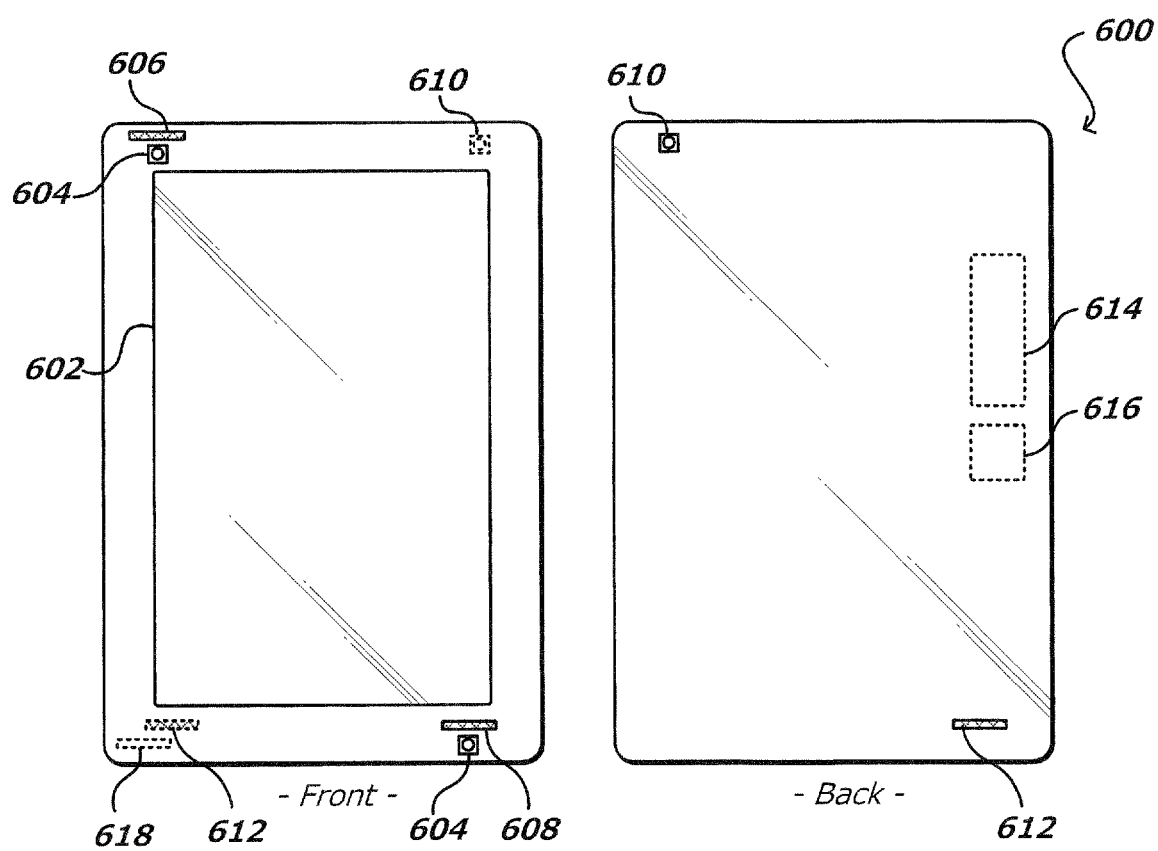
FIG. 6 illustrates front and back views of an example portable computing device that can be used in accordance with various embodiments.

FIG. 6 illustrates front and back views of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled component (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one communication mechanism 614, such as may include at least one wired or wireless component operable to communicate with one or more electronic devices. The device also includes a power system 616, such as may include a battery operable to be recharged through conventional plug-in approaches, or through other approaches such as capacitive charging through proximity with a power mat or other such component. Various other elements and/or combinations are possible as well within the scope of various embodiments.

Figure 7:
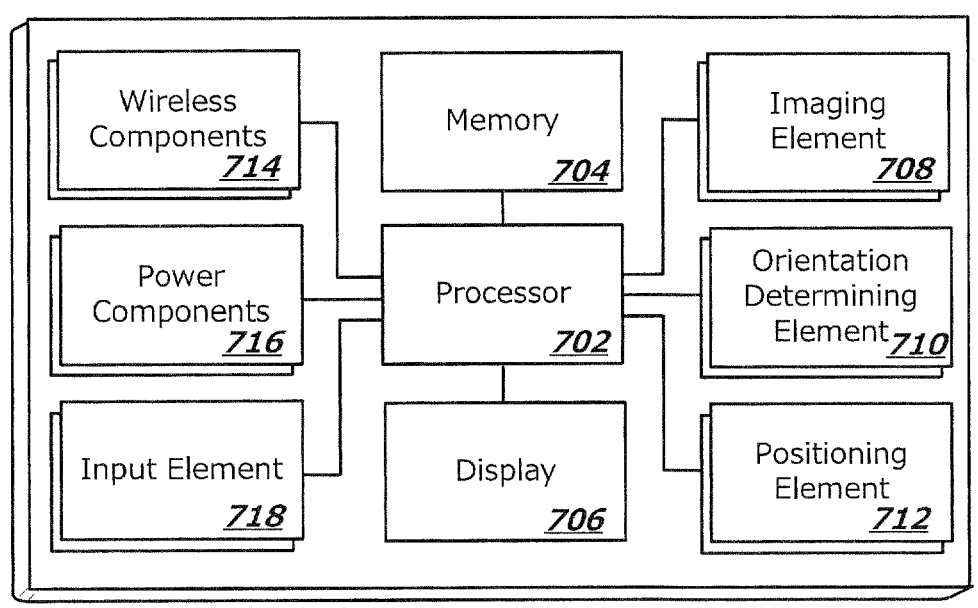
FIG. 7 illustrates an example set of basic components of a portable computing device, such as the device described with respect to FIG. 6.

FIG. 7 illustrates a set of basic components of an electronic computing device 600 such as the device 700 described with respect to FIG. 6. In this example, the device includes at least one processing unit 702 for executing instructions that can be stored in a memory component or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such component. Various other elements and/or combinations are possible as well within the scope of various embodiments.

In some embodiments the device can include at least one additional input component 718 able to receive conventional input from a user. This conventional input can include, for example, a push button, touch pad, touch screen, wheel, joystick, keyboard, mouse, keypad, or any other such component or element whereby a user can input a command to the device. These I/O components could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
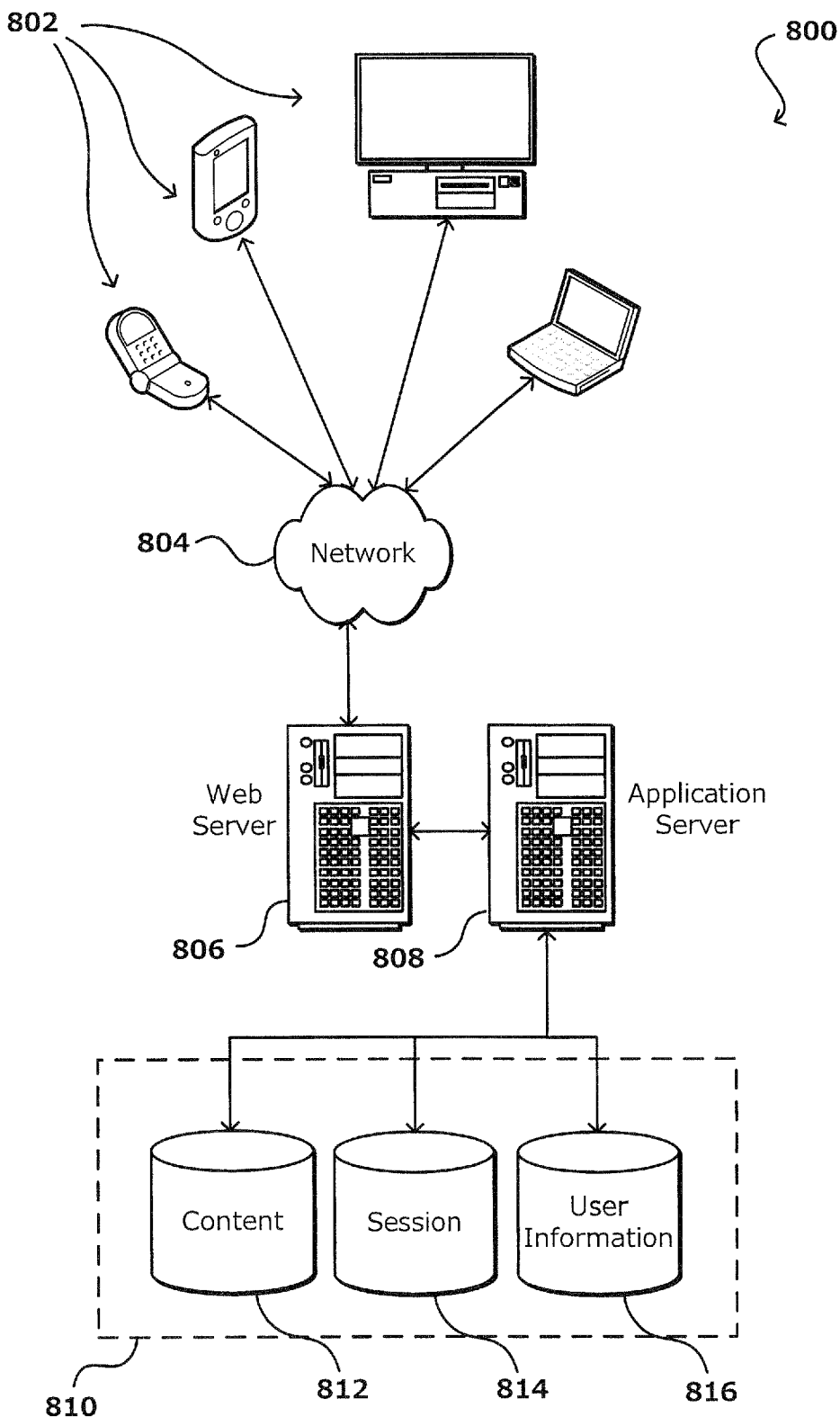
FIG. 8 illustrates an example of an environment for implementing aspects in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes electronic client devices 818, 820, 822, and 824, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any component or combination of components capable of storing, accessing and retrieving data, which may include any combination and number of data servers, databases, data storage components and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client devices 818, 820, 822, and 824 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 818, 820, 822 and 824. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized components, each such component can include hardware elements that may be electrically coupled via a bus, the elements including, for example, at least one central processing unit (CPU), at least one input component (e.g., a mouse, keyboard, controller, touch-sensitive display element or keypad) and at least one output component (e.g., a display component, printer or speaker). Such a system may also include one or more storage components, such as disk drives, optical storage components and solid-state storage components such as random access memory (RAM) or read-only memory (ROM), as well as removable media components, memory cards, flash cards, etc.

Such devices can also include a computer-readable storage media reader, a communications component (e.g., a modem, a network card (wireless or wired), an infrared communication component) and working memory as described above. The computer-readable storage media reader can be connected with, or configured to receive, a computer-readable storage medium representing remote, local, fixed and/or removable storage components as well as storage media for temporarily and/or more permanently containing, storing, transmitting and retrieving computer-readable information. The system and various devices also typically will include a number of software applications, modules, services or other elements located within at least one working memory component, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage components or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
 a first image capture component;
 a second image capture component;
 a first processor component in communication with the first image capture component, the first processor component configured to perform image signal processing; and
 a second processor component in communication with the second image capture component, the second processor component configured to perform machine vision processing.

2. The computing device of claim 1, wherein the first processor component further comprises a local memory configured to store at least a portion of image data received from the first image capture component.

3. The computing device of claim 1, wherein the first processor component further comprises a plurality of image signal processors that perform the image signal processing, wherein the plurality of image signal processors are configured in an array.

4. The computing device of claim 1, wherein the second processor component further comprises a plurality of processors that perform the machine vision processing, wherein the plurality of processors are configured in an array.

5. The computing device of claim 1, wherein the image signal processing includes at least one of dead pixel correction, lens correction, geometric correction, data compression, generating a histogram of pixel information, automatic exposure control, automatic gain control, automatic white balance, de-mosaicing, smoothing, edge enhancement, blob identification, or image thresholding.

6. The computing device of claim 1, wherein the machine vision processing includes at least one of gesture tracking, head tracking, face tracking, object tracking, face recognition, object recognition, multiple image stereo processing, three dimensional image capture, metadata tagging of image data, symbol reading, optical character recognition (OCR), one or more image fusion algorithms, or one or more sensor fusion algorithms.

7. The computing device of claim 1, wherein the first processor component comprises an interface that controls the first image capture component.

8. The computing device of claim 7, wherein the interface is:
 a mobile industry processor interface (MIPI) when the first image capture component is a high definition image capture component; or
 a serial peripheral interface (SPI) or an inter-integrated circuit (I²C) when the first image capture component is a low resolution image capture component.

9. The computing device of claim 1, wherein the second image capture component comprises an infrared (IR) camera.

10. A computer-implemented method for distributing image processing, comprising:
 causing a first image capture component, of a computing device, to send first image data to a first processor component of the computing device;
 causing a second image capture component, of the computing device, to send second image data to a second processor component of the computing device;
 performing, by the first processor component, image signal processing on the first image data; and
 performing, by the second processor component, machine vision processing on the second image data.

11. The computer-implemented method of claim 10, further comprising:
 storing, by a local memory of the first processor component, at least a portion of the first image data.

12. The computer-implemented method of claim 10, further comprising:
 performing the image signal processing by a plurality of image signal processors included in the first processor component, the plurality of image signal processors configured in an array.

13. The computer-implemented method of claim 10, further comprising:
 performing the machine visions processing by a plurality of processors included in the second processor component, the plurality of processors configured in an array.

14. The computer-implemented method of claim 10, wherein performing the image signal processing comprises:
 performing at least one of dead pixel correction, lens correction, geometric correction, data compression, generating a histogram of pixel information, automatic exposure control, automatic gain control, automatic white balance, de-mosaicing, smoothing, edge enhancement, blob identification, or image thresholding.

15. The computer-implemented method of claim 10, wherein performing the machine vision processing comprises:
 performing at least one of gesture tracking, head tracking, face tracking, object tracking, face recognition, object recognition, multiple image stereo processing, three dimensional image capture, metadata tagging of the second image data, symbol reading, optical character recognition (OCR), one or more image fusion algorithms, or one or more sensor fusion algorithms.

16. The computer-implemented method of claim 10, wherein the first processor component comprises an interface that controls the first image capture component.

17. The computer-implemented method of claim 16, wherein the interface is:
 a mobile industry processor interface (MIPI) when the first image capture component is a high definition image capture component; or
 a serial peripheral interface (SPI) or an inter-integrated circuit (I²C) when the first image capture component is a low resolution image capture component.

18. The computer-implemented method of claim 10, wherein the second image capture component comprises an infrared (IR) camera.

* * * * *